United States Patent
von Keudell et al.

(10) Patent No.: US 7,530,505 B2
(45) Date of Patent: May 12, 2009

(54) POWDER CONVEYING DEVICE AND CATCHING NOZZLE FOR THE POWDER CONVEYING DEVICE

(75) Inventors: Leopold von Keudell, Salem (DE); Renè Schmid, Hinterforst (CH); Daniel Ziwica, Arbon (CH)

(73) Assignee: J. Wagner AG, Altstätten (CH)

( * ) Notice: Subject to any disclaimer, the term of this patent is extended or adjusted under 35 U.S.C. 154(b) by 0 days.

(21) Appl. No.: 11/291,557

(22) Filed: Dec. 1, 2005

(65) Prior Publication Data
US 2006/0138252 A1 Jun. 29, 2006

(30) Foreign Application Priority Data
Dec. 16, 2004 (DE) ................. 20 2004 019 438 U

(51) Int. Cl.
*B05B 7/10* (2006.01)
(52) U.S. Cl. ................. 239/399; 239/290; 239/398; 239/405; 239/423; 239/424; 406/92; 406/94
(58) Field of Classification Search ............ 239/79, 239/85, 422, 423, 424, 428, 433, 487, 489, 239/290, 291, 293, 296, 399, 416.4, 416.5, 239/463, 478, 398, 403, 405, 435.5; 451/102; 406/12, 88, 92–94, 194; 118/308
See application file for complete search history.

(56) References Cited

U.S. PATENT DOCUMENTS

| | | | | |
|---|---|---|---|---|
| 2,362,213 A | * | 11/1944 | Miller et al. ................. 239/406 |
| 2,378,346 A | * | 6/1945 | Wigton ..................... 239/427.5 |
| 2,510,143 A | * | 6/1950 | Sandora et al. ................. 239/79 |
| 2,520,001 A | * | 8/1950 | Eicher ...................... 239/427.5 |
| 2,594,222 A | * | 4/1952 | Sandora et al. ................. 239/85 |
| 3,014,666 A | * | 12/1961 | Verbouwens ................ 239/327 |
| 3,433,418 A | * | 3/1969 | Hach, Jr. ..................... 239/422 |
| 3,627,204 A | * | 12/1971 | Stand .......................... 239/81 |
| 4,184,637 A | * | 1/1980 | Mushenko et al. ........ 239/419.3 |
| 5,505,566 A | * | 4/1996 | Gruber ........................ 406/12 |
| 6,857,826 B2 | * | 2/2005 | Seitz ........................... 406/34 |

FOREIGN PATENT DOCUMENTS

| DE | 10315029 A1 | * | 12/2003 |
|---|---|---|---|
| EP | 0629451 A1 | * | 2/1994 |
| FR | 2837115 A1 | * | 9/2003 |

\* cited by examiner

*Primary Examiner*—Len Tran
*Assistant Examiner*—Jason J Boeckmann
(74) *Attorney, Agent, or Firm*—Renner, Otto, Boiselle & Sklar, LLP

(57) ABSTRACT

The catching nozzle according to the invention for a powder conveying device has a tubular powder flow duct and a shoulder, with which the position of the catching nozzle is predetermined in the powder conveying device and that is arranged between a upstream catching nozzle section and a downstream catching nozzle section. The shoulder has a duct for dosage air, wherein the duct connects the upstream catching nozzle section to the downstream catching nozzle section. The downstream catching nozzle section is developed such that it forms, with a hose socket that can be pushed over the downstream catching nozzle section, another duct for dosage air in order to lead the dosage air up to the downstream end of the catching nozzle.

13 Claims, 3 Drawing Sheets

POWDER CONVEYING DEVICE AND CATCHING NOZZLE FOR THE POWDER CONVEYING DEVICE

CLAIM FOR PRIORITY UNDER 35 USC §119

This application claims priority under 35 USC §119 to German Patent Application No. 20 2004 019 438.4, filed Dec. 16, 2004, the entire contents of which are incorporated herein by reference.

TECHNICAL FIELD

The invention relates to a device for conveying powder and a catching nozzle, which can be used in the powder conveying device.

In order to coat objects or work pieces with powder, the powder is conveyed from a powder storage reservoir to a powder spray gun with the help of a powder conveying device and there it is applied on to the work piece with the powder spray gun. The powder conveying device, which is also called powder injector in the following, conveys the powder with the help of conveying air from the storage reservoir. Here the mixture from conveying air and powder flows into the inside of the powder injector through a powder duct of a catching nozzle, wherein additional dosage air is mixed with the powder conveying air mixture with the help of the catching nozzle in order to achieve a defined total air flow.

DESCRIPTION OF THE RELATED ART

A powder conveying equipment with a catching nozzle is known from the state of the art DE 43 19 726, wherein the catching nozzle has several inclined boreholes leading from outside towards the powder duct, in order to lead the dosage air into the powder duct. However, this embodiment of the catching nozzle has the disadvantage that the manufacturing of the diagonally running boreholes is quite laborious. Basically, boreholes, which are running crosswise to the longitudinal axis of the catching nozzle, can be produced only with additional expenditure.

SUMMARY OF THE INVENTION

An object of the invention is therefore to indicate a catching nozzle for a powder conveying device, which can be easily produced. In particular, boreholes, which are running crosswise to the longitudinal axis of the catching nozzle, should be avoided.

Advantageously the catching nozzle can be easily replaced anytime and is developed in such a way that it can be precisely arranged in the powder conveying device. Especially, the lateral and axial play as well as the angle error should be as low as possible.

Moreover, the grip of the catching nozzle should be ensured. This is especially important when taking out the catching nozzle from the powder conveying device.

Another object is to configure the catching nozzle in such a way that the powder conveying device, after the replacement of the catching nozzle, has the same qualities during the powder conveying as before the replacement. This means that the qualities of the powder conveying device should not change merely due to the replacement of the catching nozzle.

Furthermore, an object of the invention is to indicate a powder conveying device suitable to the catching nozzle.

The object is solved by a catching nozzle for a powder conveying device with the characteristics according to the present invention.

The catching nozzle according to the invention for a powder conveying device has a tubular powder flow duct and a shoulder, with which the position of the catching nozzle in the powder conveying device is predetermined and that is arranged between a upstream catching nozzle section and a downstream catching nozzle section. The shoulder itself has a duct for the dosage air, wherein the duct connects the upstream catching nozzle section to the downstream catching nozzle section. The downstream catching nozzle section is developed in such a way that it forms, with a hose socket that can be pushed over the downstream catching nozzle section, another duct for dosage air in order to lead the dosage air until the downstream end of the catching nozzle.

In addition, the object is solved by a powder conveying device with a catching nozzle with the characteristics according to the present invention.

For this purpose the powder conveying device according to the invention includes the just described catching nozzle, which is arranged in a housing of the powder conveying device. Moreover, the powder conveying device has a hose socket, which surrounds the downstream catching nozzle section of the catching nozzle.

Advantageous further developments of the invention result from the characteristics stated in the dependent claims.

In a first further development of the catching nozzle according to the invention for a power conveying device, the downstream catching nozzle section has at least one recess.

In a second further development of the catching nozzle according to the invention, a screw-shaped rib runs on the external side of the downstream catching nozzle section.

In a third further development of the catching nozzle according to the invention, the external side of the downstream catching nozzle section is cross-knurled or knurled in the longitudinal direction.

In addition, in the case of the catching nozzle according to invention, the external diameter of the downstream catching nozzle section is developed smaller than the internal diameter of the hose socket and that for the creation of the further duct for the dosage air. This has the advantage that the dosage air arrives without further ado up to the downstream end of the catching nozzle and from there it can be added to the power—conveying air mixture.

Moreover, in the case of the catching nozzle according to the invention, the duct in the shoulder can be developed as groove or as borehole.

In order to be able to place the catching nozzle precisely in the housing of the powder conveying device, an embodiment of the catching nozzle according to the invention has a first cylindrical guide surface and a second cylindrical guide surface at a distance from it and the shoulder has a conical side, wherein the guide surfaces and the side are provided for predetermining the position of the catching nozzle in the power conveying device. The shoulder can be clamped in the powder conveying device.

In addition, in the case of the catching nozzle according to the invention, the shoulder can also have another conical side.

It is further recommended, in order to solve the object, that the catching nozzle according to the invention has an annular groove for retaining an O-ring, wherein the annular groove is arranged in the area of the catching nozzle inlet. As a result, if the catching nozzle is mounted in the powder conveying device, the dosage air duct can be sealed upstream compared to the powder duct of the powder conveying device.

In another embodiment of the catching nozzle according to the invention, the diameter of the first cylindrical guide surface is smaller than the diameter of the second cylindrical guide surface. This has particularly the advantage that the catching nozzle equipped with the O-ring can be mounted more easily and that it can also again be removed more easily from the housing of the powder conveying device.

In a further development of the powder conveying device according to the invention a borehole is provided in the housing of the powder conveying device and the upstream catching nozzle section of the catching nozzle is arranged in such borehole, whereas the downstream catching nozzle section protrudes from the housing. The housing forms the stopper for the shoulder.

In an additional further development of the powder conveying device a union nut is provided, with which the catching nozzle and the hose socket can be fixed on the housing.

Finally, in the powder conveying device according to the invention a hose can be provided, which is pushed over the hose socket.

BRIEF DESCRIPTION OF THE DRAWINGS

These and other aspects of the invention are apparent from and will be elucidated in details with reference to the five embodiments described hereinafter.

DETAILED DESCRIPTION OF THE INVENTION

Figure 1:
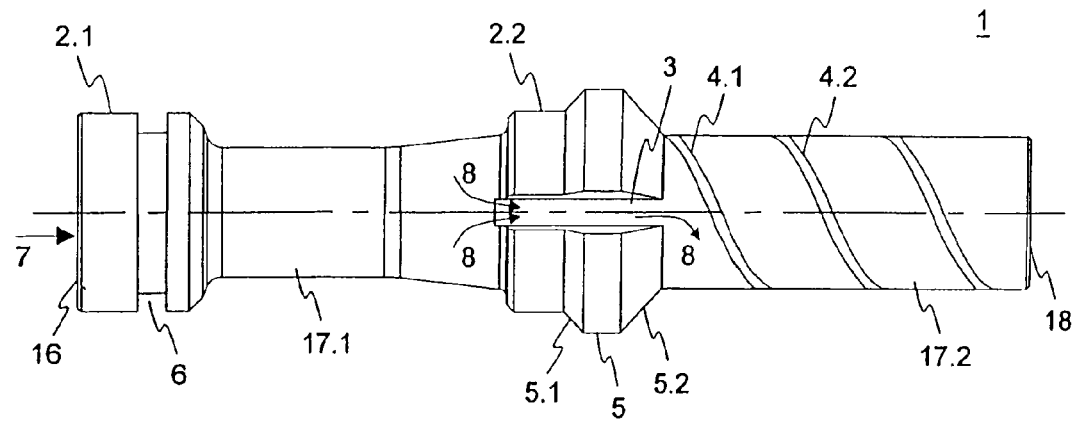
FIG. 1 shows the catching nozzle according to the invention in the side view.

A possible embodiment of the catching nozzle 1 according to the invention is shown in FIG. 1 in the side view. The catching nozzle 1 has inside a duct 22, through which, if the powder conveying device is in use, the mixture of powder and conveying air FL flows. The duct 22 is also called powder flow duct in the following. The longitudinal axis of the catching nozzle 1 is marked with the reference symbol 21 and the direction of flow is marked by the arrow 7. The mixture enters at the funnel-shaped nozzle inlet 16 into the catching nozzle 1 and is again discharged at the nozzle outlet 18 from the catching nozzle 1. In the area of the nozzle inlet 16, the catching nozzle 1 is developed cylindrically on the outside, which is used as cylindrical first guide surface 2.1.

In the embodiment shown in FIG. 1 a shoulder 5 is located approximately in the center of the catching nozzle 1, to which a second cylindrically developed guide surface 2.2 is connected on the upstream side. Both the sides 5.1 and 5.2 of the shoulder 5 are developed as double cone. The position of the catching nozzle 1 in the powder conveying device is provided above the first guide surface 2.1, the second guide surface 2.2 and the conical side 5.1 of the shoulders 5.

The catching nozzle 1 is essentially divided into two catching nozzle sections 17.1 and 17.2, wherein the upstream arranged catching nozzle section 17.1 is separated by the downstream arranged catching nozzle section 17.2 through the shoulder 5. However, in order that the dosage air DL, which is also call auxiliary air, arrives from the upstream catching nozzle section 17.1 to the downstream catching nozzle section 17.2, one or more grooves 3 are provided in the shoulders 5. Instead of the groove 3 shown in FIG. 1 a through borehole can be provided in the shoulders 5 for connecting both the catching nozzle sections 17.1 and 17.2. Two screw-shaped ribs 4.1 and 4.2 are arranged on the downstream catching nozzle section 17.2, as shown in FIG. 1. The functioning of the individual components of the catching nozzle 1 is described in details later on.

Figure 2:
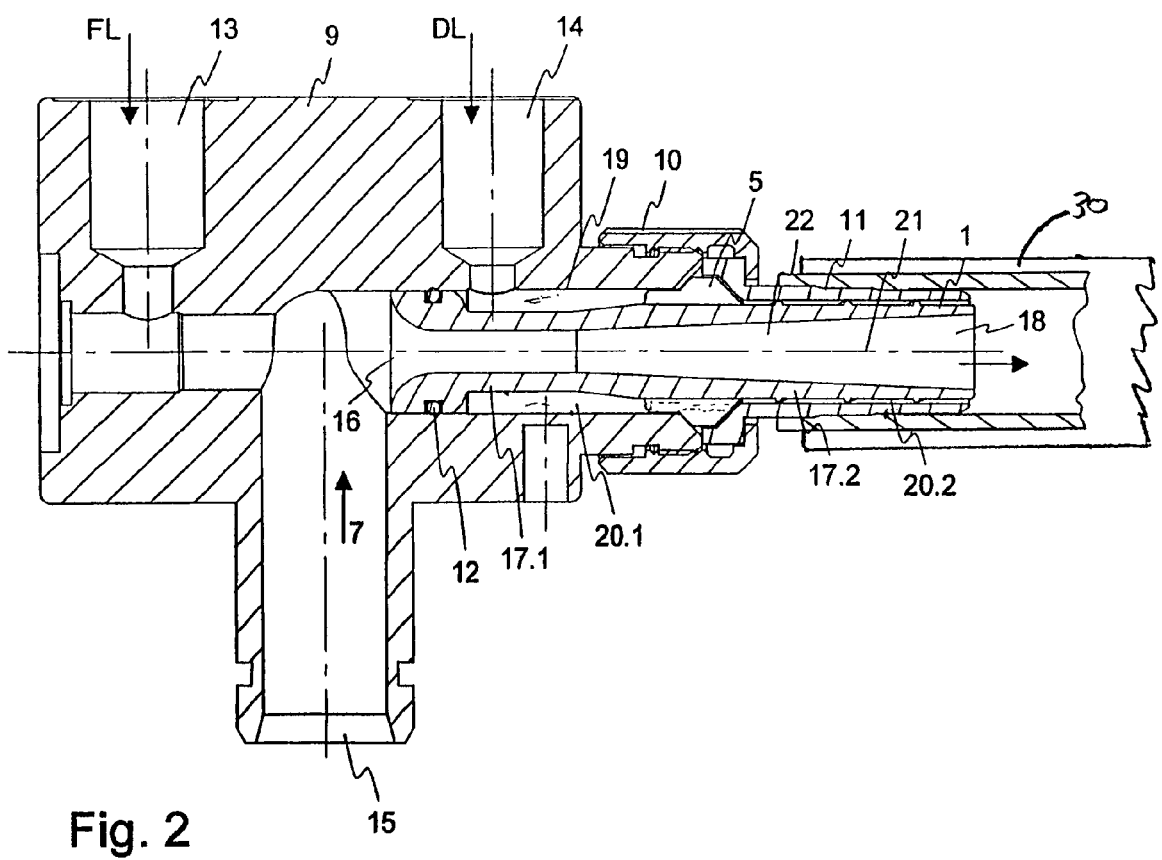
FIG. 2 shows a possible embodiment of the powder conveying device in a cross-section.

A possible embodiment of a powder conveying device is shown in a cross-section in FIG. 2. The conveying air FL flows through the conveying air inlet 13 into the powder conveying device and ensures in the inside that the powder is suctioned through the powder inlet 15 into the powder conveying device. The powder air mixture formed from the conveying air FL and the powder is now led through the catching nozzle 1 arranged in the downstream end of the powder conveying device. The catching nozzle 1 is arranged in such a way in the powder conveying device that its upstream catching nozzle section 17.1 is located in a borehole 19 of the powder conveying device and the downstream catching nozzle section 17.2 of the catching nozzle 1 protrudes from the housing 9 of the powder conveying device. A hose socket 11 is put over the downstream catching nozzle section 17.2 of the catching nozzle 1 and such hose socket 11 is fixed, together with the catching nozzle 1, on the housing 9 of the powder conveying device by means of a union nut 10. The powder conveying device also has a dosage air inlet 14, through which the dosage air DL can be added to the powder air mixture. The dosage air DL flows for this purpose first through the dosage air inlet 14 into a first dosage air duct 20.1, which is formed by the upstream catching nozzle section 17.1 and the borehole 19, and from there, through the groove 3, in a second dosage air duct 20.2, which is formed by the downstream catching nozzle section 17.2, the ribs 4.1 and 4.2 and the hose socket 11. However, the ribs 4.1 and 4.2 are not compulsorily required for the dosage air duct 20.2. After that the dosage air DL has left the second dosage air duct 20.2, it is added to the mixture made from conveying air FL and powder.

Both screw-shaped ribs 4.1 and 4.2 ensure that the dosage air DL gets a twist. The arrow 8 in FIG. 1 indicates the direction of flow of the dosage air DL. The twist enables that the dosage air does not generate a suction effect while exiting from the downstream dosage air duct 20.2. Both ribs 4.1 and 4.2 also have the advantage that they increase the grip of the catching nozzle 1. After the union nut 10 was unscrewed, the catching nozzle 1 can be pulled out manually without further ado from the powder conveying device. The number of the required ribs on the downstream catching nozzle section 17.2 depends on the technical general conditions. The same applies correspondingly to the number of the grooves 3 and/or the through boreholes through the shoulder 5.

The hose socket 11, as described in the German registered utility model DE 202 04 116, can consist of an electric non-conductive material and can be surrounded, on the outside, by a layer or a sleeve made from electrically conductive material. The sleeve surrounding the hose socket 11 can for example consist of metal or of an electrically conductive synthetic material. For the case that the hose socket 11 is surrounded by such a sleeve, the sleeve can be fixed electrically by means of the union nut 10, which also has an electrically conductive material, on the earthed injector housing 9. For this purpose the sleeve can be provided with an annular flange, which is kept pressed by the union nut against a collar on the housing 9 of the powder conveying device. For more information, particularly regarding the electrical and mechanical design of the hose socket 11, refer to the description in the document DE 202 04 116, wherein the form of the hose socket 11 should be adapted to the specific properties of the catching nozzle 1 according to the invention. It is envisaged that the hose socket 11 and the union nut 10 remain on the hose 30. Hence if the hose 30 is together with the union nut 10, separated from the injector housing 9, so the union nut 10 and the hose socket 11 remain on the hose 30, whereas the catching nozzle 1 remains in the injector housing 9.

The ribs 4.1 and 4.2 can be designed such that they ensure that the hose socket 11 is kept at a defined distance to the catching nozzle 1, so that the already mentioned dosage air duct 20.2 is formed between the outside of the catching nozzle 1 and the inside of the hose socket 11.

Figure 3:
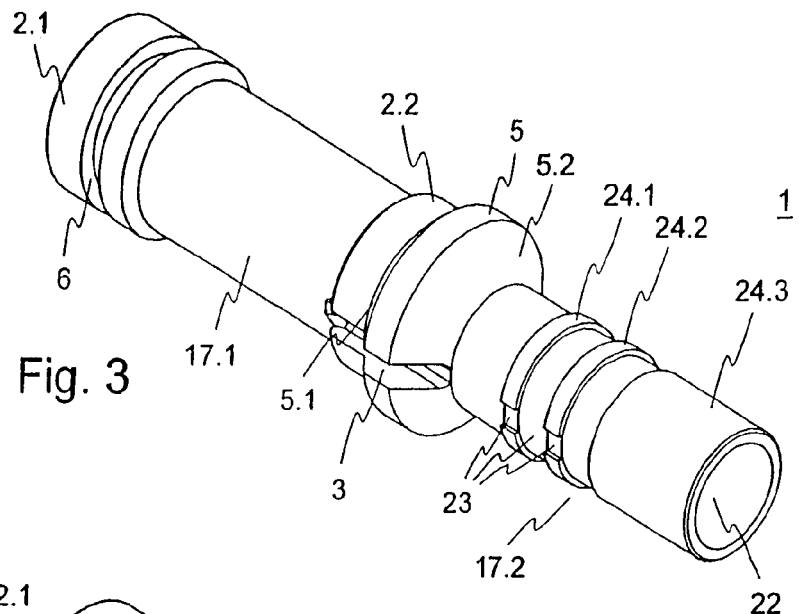
FIG. 3 shows a second possible embodiment of the catching nozzle in a three-dimensional view.

FIG. 3 shows a second possible embodiment of the catching nozzle in a three-dimensional view. It is essentially differentiated from the embodiment shown in FIG. 1 due to the fact that the downstream catching nozzle section 17.2 has several recesses 23. In addition two narrow annular elevations 24.1 and 24.2 and a wide annular elevation 24.3 are provided in the downstream catching nozzle section 17.2. The annular elevations 24.1, 24.2 and 24.3 in connexion with the recesses 23 improve, among others, the grip of the catching nozzle, what is of advantage while inserting and taking out the catching nozzle from the housing 9 of the powder conveying device.

Figure 4:
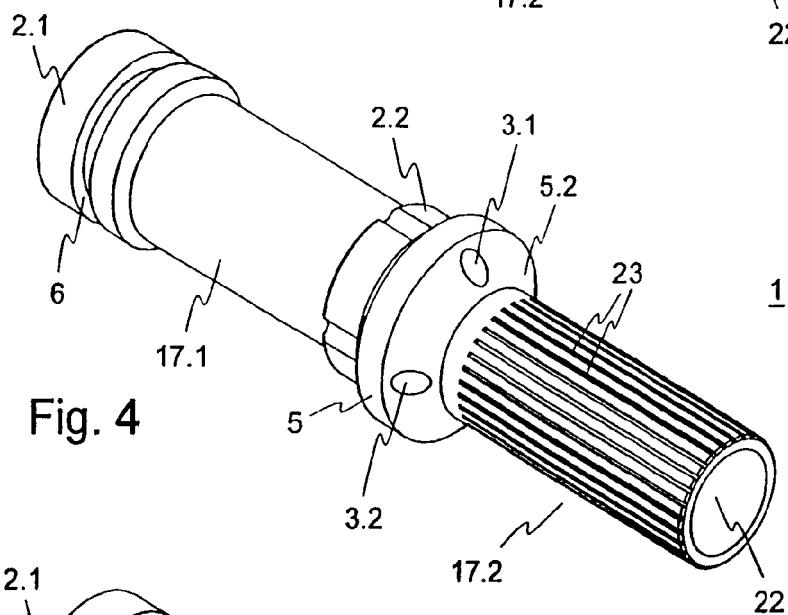
FIG. 4 shows a third possible embodiment of the catching nozzle in a three-dimensional view.
Figure 5:
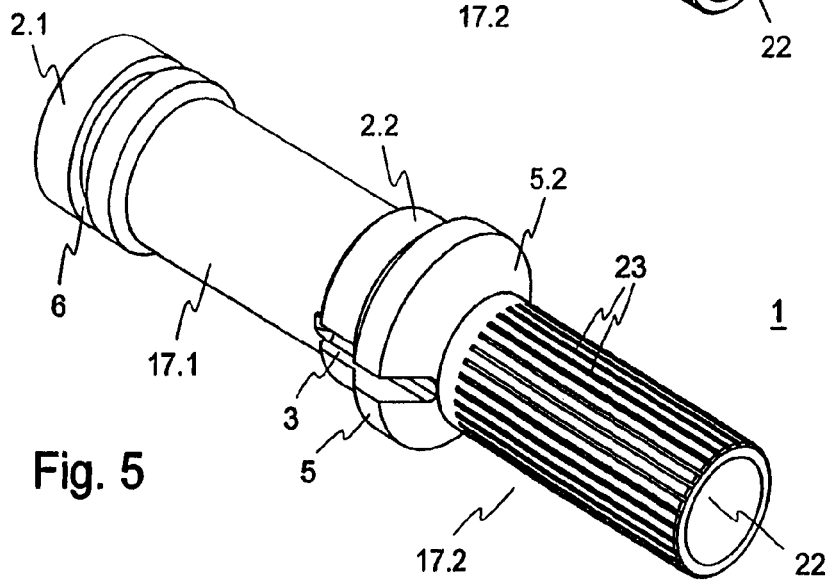
FIG. 5 shows a fourth possible embodiment of the catching nozzle in a three-dimensional view.

The FIGS. 4 and 5 show a third and a fourth embodiment of the catching nozzle 1 in a three-dimensional view. The catching nozzles shown there are essentially differentiated from the embodiment shown in FIG. 1 due to the fact that the downstream catching nozzle section 17.2 has several recesses 23 running in longitudinal direction. These can be produced, for example, with a knurling machine.

Figure 5A:
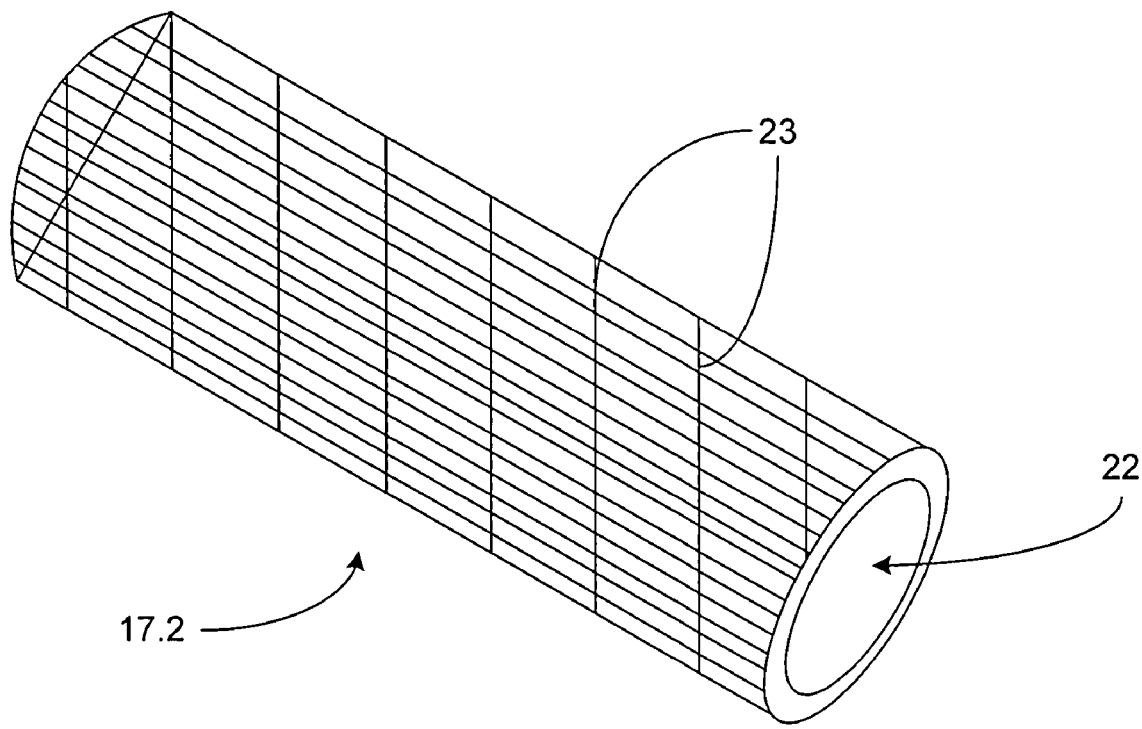
FIG. 5A shows an alternative embodiment of the downstream portion of the catching nozzle.

In an alternative embodiment shown in FIG. 5A, the downstream outside of the catching nozzle can also be cross-knurled with cross-knurls 23.

The embodiment shown in FIG. 4 is also differentiated from the embodiment shown in FIG. 1 due to the fact that several boreholes 3.1 and 3.2 as dosage air ducts are provided in the shoulder 5 instead of in the groove 3.

With the help of the O-ring 12 placed in the groove 6 it is ensured that the dosage air duct 20.1 is airtight sealed upstream compared to the powder duct of the injector. This ensures that the dosage air DL cannot arrive upstream into the powder suction duct.

The preceding description of the embodiments according to the present invention is used only for illustrative purposes and not for the purpose of restricting the invention. Different alterations and modifications are possible within the scope of the invention without abandoning the scope of the invention and its equivalents.

REFERENCE SYMBOLS LIST 1 catching nozzle
2.1 first cylindrical guide
2.2 second cylindrical guide
3 groove
3.1 borehole
3.2 borehole
4.1 rip
4.2 additional rip
5 shoulder
5.1 side, which is conical
5.2 side, which is conical
6 annular groove
7 direction of flow of the powder
8 direction of flow of the dosage air
9 injector housing
10 union nut
11 hose socket
12 O-ring
13 conveying air inlet
14 dosage air inlet
15 powder inlet
16 catching nozzle inlet
17.1 upstream catching nozzle section
17.2 downstream catching nozzle section
18 catching nozzle outlet
19 borehole
20.1 upstream dosage air duct
20.2 downstream dosage air duct
21 longitudinal axis
22 powder duct
23 recess
24.1 narrow ring
24.2 narrow ring
24.3 wide ring
FL conveying air
DL dosage air

We claim:

1. A catching nozzle for a powder conveying device, the catching nozzle comprising:
   an upstream catching nozzle section;
   a downstream catching nozzle section, the downstream catching nozzle section configured to receive a hose socket of the powder conveying device that is pushed over the downstream catching nozzle section;
   a shoulder arranged between the upstream catching nozzle section and the downstream catching nozzle section, and a first cylindrical guide surface adjacent the shoulder and arranged in the upstream catching nozzle section, the shoulder and the first cylindrical guide surface for defining a radial position of the catching nozzle in the powder conveying device;
   a tubular powder flow duct within the upstream nozzle section, downstream nozzle section and shoulder;
   a duct that passes through the shoulder and the first cylindrical guide surface for connecting dosage air from an exterior of the upstream catching nozzle section to an exterior of the downstream catching nozzle section; and
   another duct for leading dosage air along the exterior of the downstream catching nozzle section to the downstream end of the catching nozzle.

2. A catching nozzle according to claim 1, wherein the downstream catching nozzle section has at least one recess.

3. A catching nozzle according to claim 1, wherein at least one screw-shaped rib or at least a ring is provided on the outside of the downstream catching nozzle section.

4. A catching nozzle according to claim 3, wherein the another duct for leading auxiliary dosage air is defined at least in part by the outer most diameter of the downstream catching nozzle section and the inner most diameter of a hose socket.

5. A catching nozzle according to claim 1, wherein the duct for leading the dosage air is a groove or borehole.

6. A catching nozzle according to claim 1, the upstream catching nozzle section comprising:
   a second cylindrical guide surface at a distance from the first cylindrical guide surface, wherein the shoulder has a conical side,
the guide surfaces and the conical side are provided in order to predetermine the position of the catching nozzle in the powder conveying device, and
the shoulder can be clamped in the powder conveying device.

7. A catching nozzle according to claim 6, wherein the shoulder has another conical side.

8. A catching nozzle according to claim 1,
comprising an annular groove for retaining an O-ring, which is arranged in the area of a catching nozzle inlet.

9. A catching nozzle according to claim 6, wherein the diameter of the first cylindrical guide surface is smaller than the diameter of the second cylindrical guide surface.

10. A powder conveying device with a catching nozzle according to claim 1, comprising
a housing, in which the catching nozzle is arranged, and
a hose socket, which surrounds the downstream catching nozzle section.

11. A powder conveying device according to claim 10, further comprising:
a borehole in the housing, and the upstream catching nozzle section of the catching nozzle is arranged in this borehole,
wherein the housing forms a stopper for the shoulder, and the downstream catching nozzle section protrudes from the housing.

12. A powder conveying device according to claim 10, further comprising a union nut, with which the catching nozzle and the hose socket are fixed on the housing.

13. A powder conveying device according to claim 10, with a hose, which is pushed over the hose socket.

* * * * *